United States Patent Office 3,457,546
Patented July 22, 1969

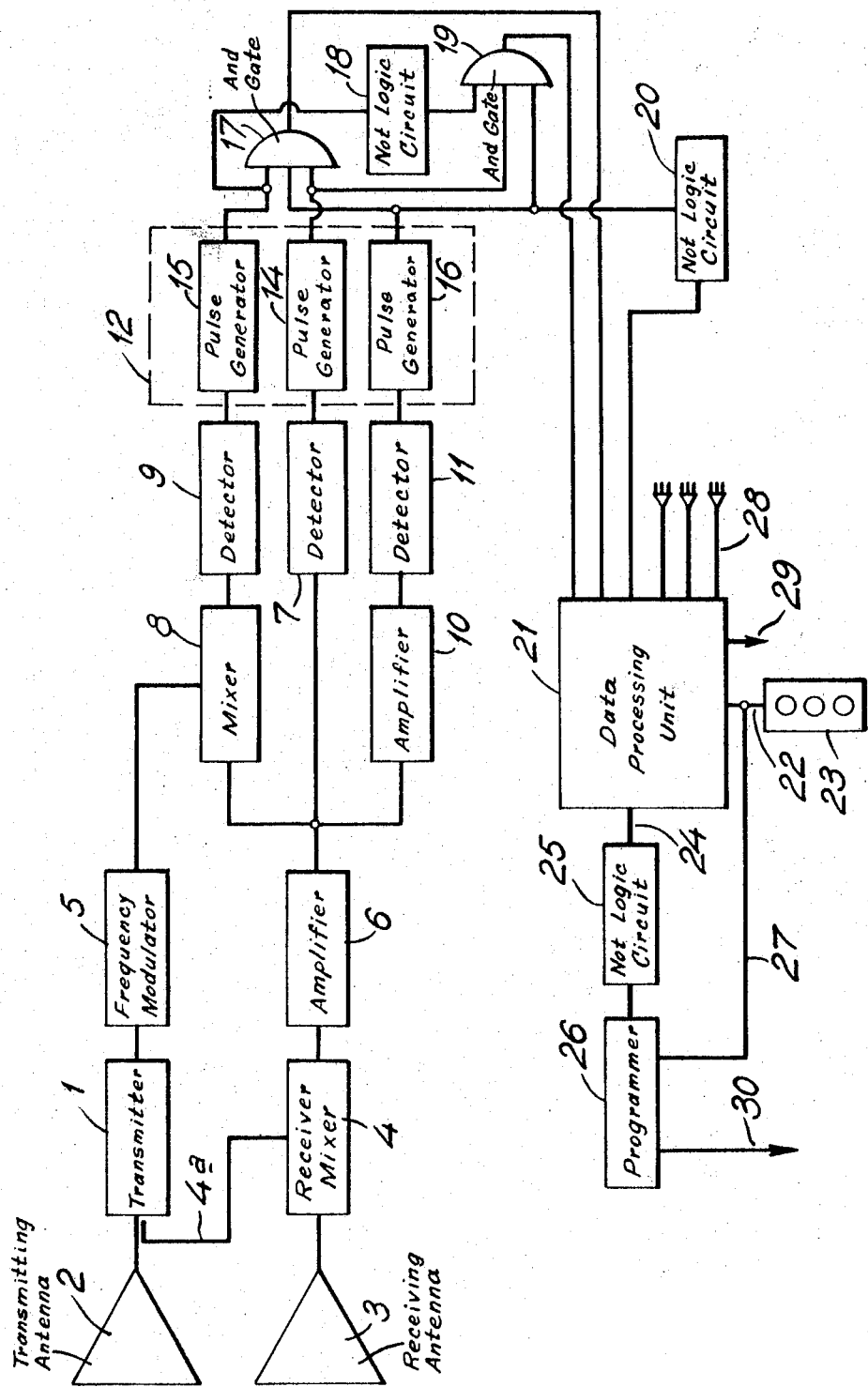

3,457,546
APPARATUS FOR CONTROLLING TRAVELLING OBJECTS, AND MORE PARTICULARLY MOTOR VEHICLES, AT INTERSECTING TRACKS OR ROADS
Jean Claude Preti, Clamart, France, assignor to Societe de Fabrication d'Instruments de Mesure (S.F.I.M.), Massy, Essonne, France
Filed Oct. 23, 1965, Ser. No. 503,661
Claims priority, application France, Nov. 3, 1964, 993,594
Int. Cl. G08b 1/095
U.S. Cl. 340—37                                                    7 Claims

ABSTRACT OF THE DISCLOSURE

Traffic control apparatus having a transmitting antenna and a receiving antenna respectively coupled to a transmitter and a receiver mixer, the latter also being coupled to the transmitter for receiving a portion of the transmitted signal. An amplifier is connected to the mixer and it has a pass band adjusted to the modulation frequency of a frequency modulator connected to the transmitter. The amplifier is connected to three sets of parallel-connected units comprising respectively a mixer electrically connected to said modulator and to a first detector in the first set, a second detector in the second set, and a secondary amplifier electrically connected to a third detector in the third set. A logic signal generator is connected to each of the three detectors and to logic circuits for controlling the movement of the objects in accordance with the information received by the receiving antenna.

This invention relates to an apparatus for controlling traveling objects, and more particularly motor vehicles, at intersecting tracks or roads, which apparatus is in turn controlled by detecting means employing the radar art and most notably Doppler radar.

Although the invention will be more particularly described with reference to motor vehicles and intersecting roads, it is to be clearly understood that it likewise applies to any other kind of object in channeled motion, non limitative examples being railroad vehicles or balls travelling along tracks.

It is well known that Doppler-type radar apparatus is usually insensitive to stationary, reflecting targets.

The present invention has primarily for its object to permit the use, with apparatus of the kind referred to, of Doppler-effect radar-type detecting means, and the obtainment with such means of an indication of the presence of halted objects or vehicles.

Preferably also, in accordance with the invention, the effects of such detecting means are concerted to permit of superimposing, upon the indications of the presence of vehicles, a count of vehicles entering the operative zone of such detecting means.

For safety reasons, it is necessary also to check the functioning of the detecting means themselves, both in the presence of halted or moving vehicles to be detected, and in their absence.

Accordingly, in the event of observance of a failure in the detection system as a result of said functional check, operation of the system is transferred to another device which then controls the traffic in accordance with a predetermined program until such time as the failed system has been repaired.

The invention accordingly includes an apparatus comprising, in respect of one of the roads, an electromagnetic radiation emitter equipped with a directional antenna associated with a transmitter and a modulator of the frequency thereof, a corresponding receiver equipped with a substantially identically oriented directional antenna and associated with a mixer stage followed by an amplifier having a pass-band adjusted to the frequency of said modulator, said amplifier being connected to three sets of parallel-connected apparatus consisting respectively, of a mixer connected to said modulator and to a first detector in the case of the first set, a second detector in the case of the second set, and a high-gain secondary amplifier connected to a third detector in the case of the third set, these three detectors being respectively connected to three logic signal generators for exploiting the information received by the transmitter-receiver (hereinafter referred to as "transceiver").

More specifically with reference to exploitation of the signals, the logic signal generators are connected to commutating logic circuits leading in turn into a common cycle-data processing machine connected to the traffic lights at each interesecting road in question, and also to a programmer which can be substituted for said data processing machine and is itself connected to said traffic lights, and which becomes operative in the event of failure of the apparatus preceding said data processing machine.

The description which follows with reference to the accompanying non-limitative exemplary drawing will give a clear understanding of how the invention can be carried into practice.

The single figure in the drawing is a highly schematic block diagram of an apparatus according to the invention, showing the manner of interconnecting the same for operating traffic lights at intersecting roads.

Said apparatus comprises an electromagnetic wave transmitter 1 the emission from which is frequency-modulated by a modulator 5 connected to transmitter 1, and said transmitter feeds an antenna 2 directed toward the lane followed, on a road, by motor vehicles approaching an intersection.

Orientated in the same direction is a receiving antenna 3 positioned adjacent antenna 2 and connected to a receiver mixer 4 which includes selective filtering circuits and which is itself connected to an amplifier 6 having a privileged pass-band. A coupling 4a is established between mixer 4 and the output of transmitter 1 in order to route at least part of the transmitted signal into mixer 4.

Amplifier 6 is connected through three parallel lines to the following sets of units:

The first line comprises a mixer 8 followed by a detector 9, which mixer is connected to modulator 5;

The second line comprises a detector 7;

The third line comprises an amplifier 10 followed by a detector 11.

The three detectors 7, 9 and 11 are respectively connected to the elements of a logic signal generator 12, and the elements 14, 15 and 16 thereof generate pulses responsive to the excitations applied to their inputs by the various signals resulting from the detecting function, as will be explained hereinbelow.

With a view to controlling traffic lights which are located at intersecting roads and are hooked up to the transceiver hereinbefore described, each generating element 14, 15 and 16 has an output connected to various elements of commutating logic circuits, which are listed below:

The output from element 14 is one of the three inputs of an AND-logic circuit 17 operating as a gate;

The output from element 15 and that from element 16 are likewise connected to gate 17;

The output from element 15 is further connected to the input of a NOT-logic circuit element 18 operating for logic changeover.

The output from element 18 is one of the inputs of a second gate 19 of identical type.

The output from element 14 is similarly connected to one of the inputs of element 19.

The output from element 16 is connected to one of the inputs of element 19 and to the input of a second changeover element 20 similar to element 18.

The output from gate 17, that from gate 19 and that from changeover element 20 are connected to the corresponding inputs of a data processing machine 21 for checking the operative cycles of the signals.

One of the outputs 22 from data processing machine 21 is connected to a set of traffic lights 23 of the type having three colored lamps. A second output 24 from data processing machine 21 is connected through a NOT-logic changeover element 25 to a programmer 26 operating, for example, in response to a clock or like timing device for providing paced traffic light control. One of the outputs 27 from programmer 26 is further connected to each output 22 and hence to the traffic lights 23.

The operation of the system hereinbefore described is as follows:

Through the agency of antenna 2, transmitter 1 propagates electromagnetic radiation which is frequency-modulated by modulator 5, this modulation being effected, for instance, at a modulation frequency FM symmetrically about a carrier frequency F.

A reception signal consisting of a portion of the emitted signal and containing the significant data is picked up by antenna 3 subsequent to reflection off a stationary or moving target such as a motor vehicle for example, located within the operative zone of the two antennas.

This signal possesses well known spectrum characteristics. At the center of the spectrum is a line representing the carrier frequency F, and to either side of this line is a symmetrical distribution of various other lines spaced by frequencies equal to FM, namely the modulation frequency.

Subsequent to a mixing in mixer 4 between the reception signal and a portion of the transmitted signal routed via coupling 4a, it is possible to eliminate the central line and to amplify any one of the lateral lines in the appropriate selective filter circuit associated with said mixer. The signal resulting from this filtering process is applied to amplifier 6. The latter is selected so that it has a tune frequency equal to the modulation frequency FM.

Thus, if a stationary target should be present in the operative zone of antennas 2 and 3, a signal of frequency FM will appear at the output of amplifier 6, and this signal will undergo detection in detector 7.

Should a target traverse the operative zone of antennas 2 and 3, a signal the frequency of which is the sum of modulation frequency FM and a frequency $fd$ due to the Doppler effect will appear at the reception end and at the output of amplifier 6. Inside mixer 8, the Doppler signal is brought out by differential mixing with the frequency FM from modulator 5. This Doppler signal of frequency $fd$ is detected in detector 9. If no stationary or moving object is present in the operative zone of the antennas, there will nonetheless appear, across the terminals of mixer 4, a signal of frequency FM which is due both to coupling 4a and to the parasite couplings between antennas 2 and 3. Obviously, this signal is much weaker than the signal obtained when an object is present in said zone (approximately one hundred times weaker). However, subsequent to the routing through amplifier 6, this one hundred times weaker signal can be amplified in variable-gain amplifier 10, i.e. in an amplifier operating at maximum gain only for an input signal the strength of which is below a predetermined limit. The amplified signal issuing from amplifier 10 then undergoes detection in detector 11.

This third channel thus permits checking for correct functioning of the transceiver, for should a failure occur either in the transceiver system as a whole, or even in the modulator 5, detector 11 will manifestly no longer deliver signals.

For a proper understanding of the manner of operation of the logic commutator, consideration will again be given to the case of a vehicle halted within range of antennas 2 and 3, in which the pulse from detector 7 will be applied to logic signal generating element 14. If no signal appears at the output of detector 9, then logic signal generator 15 will also not deliver any signal. On the other hand, provided the transceiver system is functioning correctly, logic signals will be delivered by generator 16 when the same is suitably energized by detector 11.

Consequently, AND-logic circuit gate 17 will deliver no signals since one of the inputs thereinto is not energized.

On the other hand, the similar AND-gate 19 will be energized simultaneously on its three inputs, due to the fact that the input thereof connected to the output from generating element 14 is energized; this also applies to the input connected to the output from element 16; further, the input connected to changeover element 18 (a NOT-logic circuit) will be energized since the input of element 18 is not energized.

The output from gate 19 will therefore deliver a no-count presence signal to data processing machine 21.

If a moving vehicle is within the range of antennas 2 and 3, the three inputs to gate 17 will be fed with logic signals. Changeover element 18 will be energized by the output from generating element 15, and gate 19 will be blocked. As a result, only the output from gate 17 feeds data processing machine 21 with logic signals indicative of the presence and counting of vehicles.

When the system is functioning correctly, the output from generating element 16 will invariably energize the input to logic changeover circuit 20, so that the output therefrom will not be fed into data processing machine 21.

This machine, which is of known type, operates as a function of both the counting and presence of vehicles on the particular road involved in the field of surveillance of antennas 2 and 3, and activates the traffic lights 23 for compatibly opening and closing that road, while making allowance for various other factors, notably such factors as arise from movements or halts on a parallel road along which traffic flows in the opposite direction, or on roads crossing those two roads, and the state of the traffic lights on these other roads.

Should operation of the transceiver, the modulator, or the logic signal generators be disrupted, then gates 17 and 19 would no longer send pulses to data processing machine 21, but on the other hand changeover element 20 would feed the machine 21 via its corresponding input.

The effect of this would be to cut off the output from data processing machine 21 to traffic lights 23 and to cut off the feed to logic circuit 25, which is also a NOT-circuit. Programmer 26 is then activated responsively to logic circuit 25 and may be so devised, for example, as to cyclically transpose the opening and closing of traffic signals at the intersection in question.

Obviously, in cases where four roads of equal importance lead up to a common intersection point, each road must be equipped with a transceiver system and a commutating system as hereinbefore described, it being possible for the latter to be respectively connected, via three-way inputs 28, to a common cycle-check-data processing machine 21, in which case the latter will comprise as many outputs 29 as there are traffic lights, and these outputs 29 will in turn be connected to as many outputs 30 of the programmer 26.

The invention thus provides a system which dispenses with contact-type pedals or infrared type barriers and therefore is much more economical to construct and operate. It additionally affords complete reliability in conjunction with all the advantages inherent in radar detection, namely imperviousness to weather conditions, disrupting emanations of light, or malicious tampering, in particlar.

It goes without saying that many changes and substitutions of parts may be made to the specific form of embodiment hereinbefore described, without departing from the scope of the invention. By way of example, logic circuit element 25 could be used not only to activate programmer 26 but also to generate a signal for setting off an alarm located remotely, in situ, or both, for notifying repair squads. Likewise, alternative traffic flows could be initiated for circumventing a road intersection which is in danger of causing a bottleneck due to failure of the traffic lights.

Manifestly, as stated in the preamble, the subject apparatus of this invention is applicable to intersections of various kinds, and notably to tracks along which objects other than motor vehicles travel. Further, the receiving and transmitting antennas could be merged into one and the apparatus could have a duplexer associated with it for separating the transmitted and received signals at the output from a common antenna.

Further, instead of being concerned with moving objects approaching an intersection point, the surveillance function performed by this electromagnetic detector system could involve receding objects, or even objects some of which are approaching and some receding, these functions being dependent upon the geometry imparted to the antennas.

Lastly, the means used to control the traffic could be other than traffic lights, examples being barriers of any kind or switchgear used on intersecting tracks.

What I claim is:

1. In apparatus for controlling moving objects, and more specifically motor vehicles by traffic lights at intersecting roads, said apparatus being of the kind utilizing the detector means employed in Doppler-effect radar and wherein at least one track to be supervised is equipped with a transceiver system having at least one directional antenna which covers a supervision area of said track and delivers information, in combination, a transmitter, a transmission frequency modulator electrically connected to said transmitter, a receiver mixer, an electrical coupling between said transmitter and said receiver for transmitting to said receiver mixer a portion of the transmitted signal, an amplifier which has a pass-band adjusted to the modulation frequency of said modulator and which is electrically connected to said mixer, three sets of units connected in parallel to said amplifier and comprising respectively a mixer electrically connected to said modulator and to a first detector in the first set, a second detector in the second set, and a secondary amplifier electrically connected to a third detector in the third set, logic signal generators electrically connected to said first, second and third detectors and responsive to detected signals, and logic circuits electrically connected to said generators for controlling movement of said objects as a function of said information.

2. In controlling apparatus as claimed in claim 1, wherein said logic signal generators comprise, in respect of each detector thereof, a pulse generator electrically connected to the corresponding detector that generates logic signals.

3. In controlling apparatus as claimed in claim 2, data processing means electrically connected to said logic circuits and control means for moving objects connected to said logic circuits.

4. In controlling apparatus as claimed in claim 3, logic changeover means electrically connected to said data processing means, a programmer electrically connected to said logic changeover means, said control means being electrically connected to both said data processing means and said programmer.

5. In controlling apparatus as claimed in claim 3, wherein said logic circuits comprise a first AND-logic circuit electrically connected via a first input to an output from a first logic signal generator and to an input of a first NOT-logic circuit, said first AND-logic circuit being electrically connected through a second input thereof to an output from a third logic signal generator, to a third input of a second AND-logic circuit and to an input of a second NOT-logic circuit, a third input of said first AND-logic circuit being electrically connected to an output from a second logic signal generator and to a second input of said second AND-logic circuit, an output for said first AND-logic circuit, electrically connected to a first input of said data processing means, an output from said second AND-logic circuit electrically connected to a second corresponding input of said data processing means, and an output from said second NOT-logic circuit electrically connected to a third input of said data processing means.

6. In apparatus for controlling objects moving along tracks, and more particularly motor vehicles at a road intersection by means of traffic lights, said apparatus being of the kind utilizing the detector means employed in Doppler-effect radar, a plurality of tracks or roads at said intersection comprising respectively, for their supervision, a transceiver system having at least one data furnishing directional antenna covering a supervision area of the corresponding track or road, in combination, a plurality of transmitters, a modulator of the transmission frequency electrically connected to each associated transmitter, a plurality of associated receivers, a mixer stage electrically connected to each receiver, an electrical coupling in each mixer-transmitter pair for transmitting to the associated mixer a portion of the transmitted signal, an amplifier which has a pass-band adjusted to the modulation frequency and which is electrically connected to each mixer, three sets of units electrically connected in parallel to each of said amplifiers, each set comprising a mixer electrically connected to said associated modulator and to a first detector in the first set, a second detector in the second set, and an associated secondary amplifier electrically connected to a third detector in the third set, logic signal generators having a plurality of inputs electrically connected respectively to said first, second and third detectors of each corresponding set, and logic circuits electrically connected to said generators for controlling movement of said objects according to the information received from said plurality of tracks or roads.

7. In a controlling apparatus as claimed in claim 6, a single data processing means electrically connected to said logic circuits, a single logic changeover means electrically connected to an output of said single data processing means, a single programmer electrically connected to said changeover means, said data processing means having as many outputs as there are intersecting tracks or roads and said programmer having an equal number of outputs, the plurality of outputs from said data processing means and said programmer being respectively electrically connected in pairs to a corresponding number of means for controlling the movement of the objects.

References Cited

UNITED STATES PATENTS 3,072,901   1/1963   Ruppersberg _____ 340—38

THOMAS B. HABECKER, Primary Examiner

U.S. Cl. X.R.

343—17.5